(12) United States Patent
Bergdal et al.

(10) Patent No.: US 11,092,231 B2
(45) Date of Patent: Aug. 17, 2021

(54) AXLE ASSEMBLY AND VEHICLE

(71) Applicant: Scania CV AB, Södertälje (SE)

(72) Inventors: Tobias Bergdal, Skärholmen (SE);
Johan Gestner, Stockholm (SE);
Joakim Pettersson, Södertälje (SE)

(73) Assignee: Scania CV AB, Södertälje (SE)

( * ) Notice: Subject to any disclaimer, the term of this patent is extended or adjusted under 35 U.S.C. 154(b) by 0 days.

(21) Appl. No.: 16/763,254

(22) PCT Filed: Nov. 12, 2018

(86) PCT No.: PCT/SE2018/051154
§ 371 (c)(1),
(2) Date: May 12, 2020

(87) PCT Pub. No.: WO2019/103679
PCT Pub. Date: May 31, 2019

(65) Prior Publication Data
US 2020/0292057 A1     Sep. 17, 2020

(30) Foreign Application Priority Data

Nov. 21, 2017 (SE) .................................... 1751428-2

(51) Int. Cl.
*F16H 57/04*     (2010.01)
*F16H 48/42*     (2012.01)

(52) U.S. Cl.
CPC .......... *F16H 57/0483* (2013.01); *F16H 48/42* (2013.01); *F16H 57/0427* (2013.01); *F16H 57/0471* (2013.01); *F16H 2048/423* (2013.01)

(58) Field of Classification Search
CPC .................... F16H 2048/423; F16H 57/0427
See application file for complete search history.

(56) References Cited

U.S. PATENT DOCUMENTS 3,388,760 A    6/1968   Christie
5,404,963 A    4/1995   Crepas et al.
(Continued)

FOREIGN PATENT DOCUMENTS

CN    201496508 U    6/2010
CN    203023428 U    6/2013
(Continued)

OTHER PUBLICATIONS

Scania CV AB, International Application No. PCT/SE2018/051154, International Search Report, dated Jan. 14, 2019.
(Continued)

*Primary Examiner* — Stacey A Fluhart
(74) *Attorney, Agent, or Firm* — Moore & Van Allen PLLC; W. Kevin Ransom

(57) ABSTRACT

Disclosed herein is an axle assembly and a heavy load vehicle comprising the axel assembly. The axle assembly comprises an interaxle differential configured to distribute torque to first and second axles. The interaxle differential comprises an input shaft and an output shaft. A first gear wheel is journaled in a first bearing about the input shaft. The input shaft is journaled in relation to the output shaft via a tapered roller bearing having a small end and a large end. A lubricant receiving space is fluidly connected to the small end of the tapered roller bearing, and the large end of tapered roller bearing is fluidly connected to the first bearing. Thus, the first bearing is lubricated when there exists a difference in rotational speed between the input and output shafts.

18 Claims, 2 Drawing Sheets

(56) References Cited

U.S. PATENT DOCUMENTS

| | | | | |
|---|---|---|---|---|
| 5,662,544 | A | * | 9/1997 | Schlosser ............... F16H 48/08 |
| | | | | 475/230 |
| 6,425,840 | B1 | * | 7/2002 | Johansson .............. B60K 17/16 |
| | | | | 475/223 |
| 2007/0004262 | A1 | * | 1/2007 | Imbert ............... F16H 57/0483 |
| | | | | 439/344 |
| 2015/0114757 | A1 | | 4/2015 | Yoshizawa et al. |
| 2017/0074390 | A1 | | 3/2017 | Hayes et al. |

FOREIGN PATENT DOCUMENTS

| | | | | |
|---|---|---|---|---|
| EP | 0373495 | A1 | * | 6/1990 ......... F16H 57/0434 |
| EP | 0373495 | A1 | | 6/1990 |
| JP | H0538962 | A | | 2/1993 |
| JP | H08135771 | A1 | | 5/1996 |
| WO | 9934996 | A1 | | 7/1999 |
| WO | 2004009392 | A1 | | 1/2004 |
| WO | 2014038994 | A1 | | 3/2014 |

OTHER PUBLICATIONS

Scania CV AB, International Application No. PCT/SE2018/051154, Written Opinion, dated Jan. 14, 2019.

Scania CV AB, Swedish Application No. 1751428-2, Office Action, dated Jun. 21, 2018.

Scania CV AB, International Application No. PCT/SE2018/051154, International Preliminary Report on Patentability, dated May 26, 2020.

Scania CV AB, European Application No. 18882094.8, Extended European Search Report, dated Jun. 22, 2021.

Scania CV AB, Korean Patent Application No. 10-2020-7013880, Office Action, dated May 25, 2021.

* cited by examiner

AXLE ASSEMBLY AND VEHICLE

CROSS-REFERENCE TO RELATED APPLICATIONS

This application is a national stage application (filed under 35 § U.S.C. 371) of PCT/SE2018/051154, filed Nov. 12, 2018 of the same title, which, in turn, claims priority to Swedish Application No 1751428-2 filed Nov. 21, 2017; the contents of each of which are hereby incorporated by reference.

FIELD OF THE INVENTION

The present disclosure relates to an axle assembly, and to a heavy load vehicle comprising an axle assembly.

BACKGROUND OF THE INVENTION

A heavy load vehicle may be provided with a pair of axles. For instance, a heavy load vehicle may comprise a first driven axle and second driven axle. The first and second driven axles may be arranged closely together, such as e.g. in a 6×4 truck. In most cases, an interaxle differential, also referred to as bogie differential or tandem differential, is arranged between the first and second driven axles. The interaxle differential enables differences in rotational speed between the first and second driven axles.

The interaxle differential comprises an input shaft and an output shaft having a common rotational axis. Along the common rotational axis, parts of the interaxle differential are rotatably arranged. Also, one or more gear wheels may be arranged to rotate about the common rotational axis. In a heavy load vehicle, all these rotating elements operate under high load conditions. Failure and wear on bearings of such rotating elements may occur due to poor lubrication. Hence, lubrication of all rotating elements is of uttermost importance. An axle assembly wherein drive torque is distributed to a first axle and a second axle comprises such an interaxle differential. Oil, which is the most common lubricant in axle assemblies, both lubricates and cools elements of the axle assembly.

Providing the necessary amount of lubricant to some of the rotating elements, such as e.g. the parts of the interaxle differential and the one or more gear wheels may be more difficult than to other rotating elements. For instance, one of the input shaft and the output shaft may be provided with a lubrication channel, through which lubricant may be transported to a bearing of the parts of the interaxle differential and/or the one or more gear wheels. A further option may be for a bearing of the input shaft or the output shaft to transport lubricant towards a bearing of the parts of the interaxle differential and/or the one or more gear wheels.

U.S. Pat. No. 5,404,963 discloses a lubrication system for a helical gear thrust washer, a helical gear journal, and interaxle differential for tandem drive axles. An input shaft is journaled in a bearing supplied on one side with a gravity flow of lubricant from a passage. The opposite side of the bearing has an annular lubricant chamber formed by an annular baffle member surrounding the input shaft on an interior side of the bearing. The bearing pumps lubricant to the annular chamber. The annular passage communicates via an axial passage, formed through a portion of the input shaft, with the parts to be lubricated.

US 2017/0074390 discloses an axle assembly having a lubricant passage, which provides lubricant to an interaxle differential unit via a roller bearing assembly and a flange lubricant hole that is provided in a flange portion of an input shaft. A first roller bearing assembly supports the input shaft, which is configured to provide torque to a first axle. An output shaft is configured to provide torque to a second axle assembly. The interaxle differential unit is operatively coupled to the input shaft and the output shaft and compensates for rotational speed differences between the input shaft and the output shaft. Lubricant flows through the first roller bearing assembly and then passes through the flange lubricant hole to lubricate the interaxle differential unit.

There still exists a need for efficient ways of providing lubricant to rotating elements in an axle assembly.

SUMMARY OF THE INVENTION

It would be advantageous to achieve an axle assembly wherein lubricant is provided to at least one journaled element of an interaxle differential in an efficient and economical manner. It would further be advantageous to achieve a vehicle comprising an axle assembly wherein lubricant is provided to at least one journaled element of an interaxle differential in an efficient and economical manner. To address these concerns, an axle assembly, and a vehicle, having the features defined in the appended independent claims are provided.

According to an aspect, there is provided an axle assembly for a heavy load vehicle comprising a housing, and an interaxle differential configured to distribute torque to a first axle and a second axle. The interaxle differential comprises an input shaft and an output shaft, each journaled in the housing and having a common rotational axis, the input shaft being journaled in relation to the output shaft. The input shaft is connected to the first axle via a first gear wheel journaled in a first bearing about the input shaft, and the output shaft is configured to be connected to the second axle. The interaxle differential further comprises a differential spider and at least one pinion gear, the differential spider being rotationally locked to the input shaft, and the at least one pinion gear engaging with the gear wheel and the output shaft. The input shaft is journaled in relation to the output shaft via a tapered roller bearing having a small end and a large end, wherein a lubricant receiving space is provided in the housing, wherein the lubricant receiving space is fluidly connected to the small end of tapered roller bearing, and wherein the large end of the tapered roller bearing is fluidly connected to the first bearing.

Since the input shaft is journaled in relation to the output shaft via a tapered roller bearing having a small end and a large end, the tapered roller bearing will rotate only when there is a rotational speed difference between the input shaft and the output shaft. Since a lubricant receiving space is provided in the housing, the lubricant receiving space being fluidly connected to the small end of the tapered roller bearing, lubricant from the lubricant receiving space will be pumped through the tapered roller bearing when there is a rotational speed difference between the input shaft and the output shaft. Since the large end of the tapered roller bearing is fluidly connected to the first bearing, lubricant is pumped to the first bearing when there is a rotational speed difference between the input shaft and the output shaft. Accordingly, lubricant is pumped to the first bearing from the tapered roller bearing, i.e. the bearing of the first gear wheel, when there is a rotational speed difference between the input shaft and the output shaft, i.e. under operating conditions of the axle assembly when the first bearing is in particular need of lubrication. When there is no rotational speed difference between the input shaft and the output shaft, the first gear wheel does not rotate in relation to the input shaft, and no lubricant is pumped to the first bearing.

It has been realised by the inventors that the first bearing requires adequate lubrication when there exists a differential rotational speed between the input shaft and the output shaft of the axle assembly, i.e. when there exists a rotational speed difference between the first axle and the second axle. When the output shaft rotates with the same rotational speed as the input shaft, the first gear wheel which is connected to the at least one pinion gear of the interaxle differential, does not rotate in relation to the input and output shafts and accordingly, and there is no rotation in, or at, the first bearing arranged between the input shaft and the first gear wheel. Thus, lubricant is provided to the first bearing by the tapered roller bearing only when a rotational speed difference between the input shaft and the output shaft exists. Moreover, by utilizing the taper roller bearing for pumping the lubricant to the first bearing, the larger the differences in rotational speed between the input shaft and the output shaft gets, the more lubricant the taper roller bearing is transporting to the first bearing. When the rotational speed difference is high, is also when the most lubricant is needed at the first bearing.

The first axle and the second axle are driven axles. The first and second axles may be driven by a combustion engine, and/or other suitable power source. The interaxle differential permits rotational speed differences between the first axle and the second axle. Such rotational speed differences may occur e.g. when there is a difference in rolling radiuses between one or more wheels on the first and second axles, spin out effects between the axles occur, during narrow turning, etc. Differences in rolling radiuses may be due to differences in tyre pressure, or a difference in wear of the tyres. The first and second axles may be arranged in a bogie configuration. The relevant vehicle may comprise one or more further driven axles. Between each of the driven axles there may be arranged an interaxle differential.

The at least one pinion gear of the interaxle differential may engage directly with the first gear wheel. Thus, an axial face of the first gear wheel may be provided with first cogs configured for engagement with the at least one pinion gear, and radially outer second cogs for driving the first axle. Alternatively, the at least one pinion gear may engage indirectly with the first gear wheel, via a differential gear connected to the first gear wheel. The at least one pinion gear may engage indirectly with the output shaft, via a second gear wheel, see below. The lubricant receiving space in the housing may receive the lubricant from a lubricant pump, or from lubricant splashing within the housing.

Herein, axial and radial directions are defined in relation to the common rotational axis of the input and output shafts. That is, axial directions extend in parallel with the common rotational axis, and radial directions extend perpendicularly to the common rotational axis. Similarly, axial portions of components of the axle assembly are arranged at axial positions along the common rotational axis and extend at least partially perpendicularly to the common rotational axis, and radial portions of components of the axle assembly are arranged at radial positions in relation to the common rotational axis and extend at least partially in parallel with the common rotational axis.

According to embodiments, the axle assembly may comprise a second gear wheel rotationally locked to the output shaft and configured to engage with the at least one pinion gear. In this manner, torque may be distributed from the input shaft via the interaxle differential to the output shaft. The second gear wheel may form a differential gear of the interaxle differential.

According to embodiments, the tapered roller bearing may be arranged in a first bearing seat provided at an end of the input shaft, and a second bearing seat provided in the second gear wheel. In this manner, the tapered roller bearing may rotationally support the input and output shafts in relation to each other.

According to embodiments, the output shaft may be journaled in the housing via the second gear wheel. In this manner, a compact rotational support at one end of the output shaft may be provided.

According to embodiments, a first lubricant path may extend through, or along, the second gear wheel from the lubricant receiving space to the small end of the tapered roller bearing. In this manner, lubricant may be provided to the small end of the tapered roller bearing from the lubricant receiving space via the first lubricant path. The lubricant receiving space thus, may be arranged on a different axial side of the second gear wheel than the tapered roller bearing.

According to embodiments, a second lubricant path may extend through, or along the differential spider from the large end of the tapered roller bearing to the first bearing. In this manner, lubricant pumped from the tapered roller bearing may be provided to the first bearing via the second lubricant path, although the tapered roller bearing may be arranged on a different axial side of the differential spider than the first bearing.

According to embodiments, the second lubricant path extends through the first bearing. In this manner, the tapered roller bearing may pump lubricant not only to the first bearing, but also to further parts requiring lubrication when there exists a rotational speed difference between the input shaft and the output shaft, such as e.g. to an axial bearing supporting the first gear wheel.

According to embodiments, the second lubricant path may comprise a first annular space formed between the input shaft, the large end of the tapered roller bearing, and a first axial portion of the differential spider. In this manner, the first portion of the second lubricant path may be provided by the first annular space for leading lubricant to the differential spider.

According to embodiments, the second lubricant path may comprise a second annular space formed between the input shaft, a second axial portion of the differential spider, and the first gear wheel. In this manner, a further portion of the second lubricant path may be provided by the second annular space for leading lubricant from the differential spider to the first bearing.

According to a further aspect there is provided a heavy load vehicle comprising a first driven axle, a second driven axle, and an axle assembly arranged between the first driven axle and the second driven axle. The axle assembly is an axle assembly according to any one of aspects and/or embodiments discussed herein.

In such a heavy load vehicle, as discussed above, lubricant is pumped to the first bearing from the tapered roller bearing, when there is a rotational speed difference between the input shaft and the output shaft, i.e. under operating conditions of the axle assembly when the first bearing is in particular need of lubrication. When there is no rotational speed difference between the input shaft and the output shaft, no lubricant is pumped to the first bearing.

The heavy load vehicle may be e.g. a heavy goods vehicle, a lorry, a truck, a pickup, a van, a wheel loader, a bus, or other similar motorized manned or unmanned vehicle, designed for land-based propulsion.

Further features of, and advantages with, the invention will become apparent when studying the appended claims and the following detailed description.

BRIEF DESCRIPTION OF THE DRAWINGS

Various aspects and/or embodiments of the invention, including its particular features and advantages, will be readily understood from the example embodiments discussed in the following detailed description and the accompanying drawings, in which.

DETAILED DESCRIPTION OF THE INVENTION

Aspects and/or embodiments of the invention will now be described more fully. Like numbers refer to like elements throughout. Well-known functions or constructions will not necessarily be described in detail for brevity and/or clarity.

Figure 1:
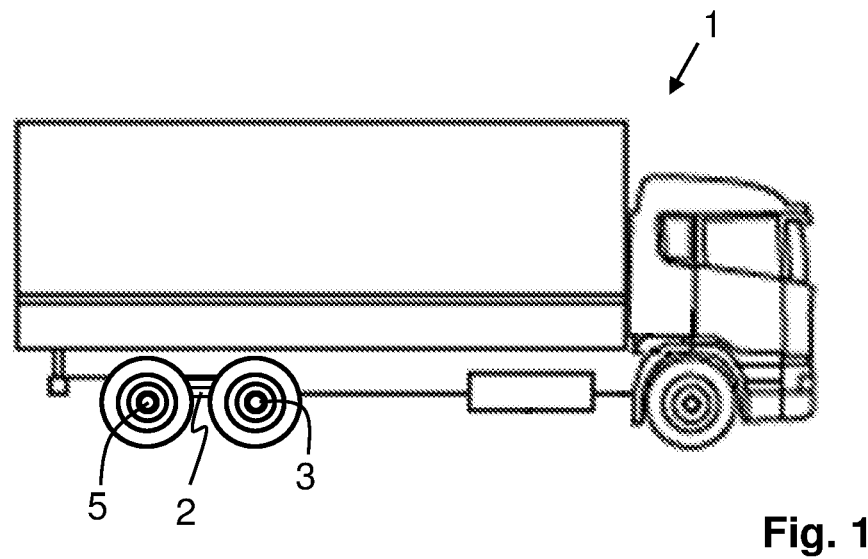
FIG. 1 illustrates a heavy load vehicle according to embodiments.

FIG. 1 illustrates a heavy load vehicle 1 according to embodiments. The heavy load vehicle 1 exemplified in theses embodiments is a truck. The heavy load vehicle 1 comprises a first driven axle 3 and a second driven axle 5. The first and second driven axles 3, 5 are rear axles of the heavy load vehicle 1. The heavy load vehicle 1 further comprises an axle assembly 2 arranged between the first driven axle 3 and the second driven axle 5. The axle assembly 2 is an axle assembly according to any one of aspects and/or embodiments discussed herein. Naturally, the axle assembly 2 may be utilised in a vehicle comprising two driven front axles.

Figure 2:
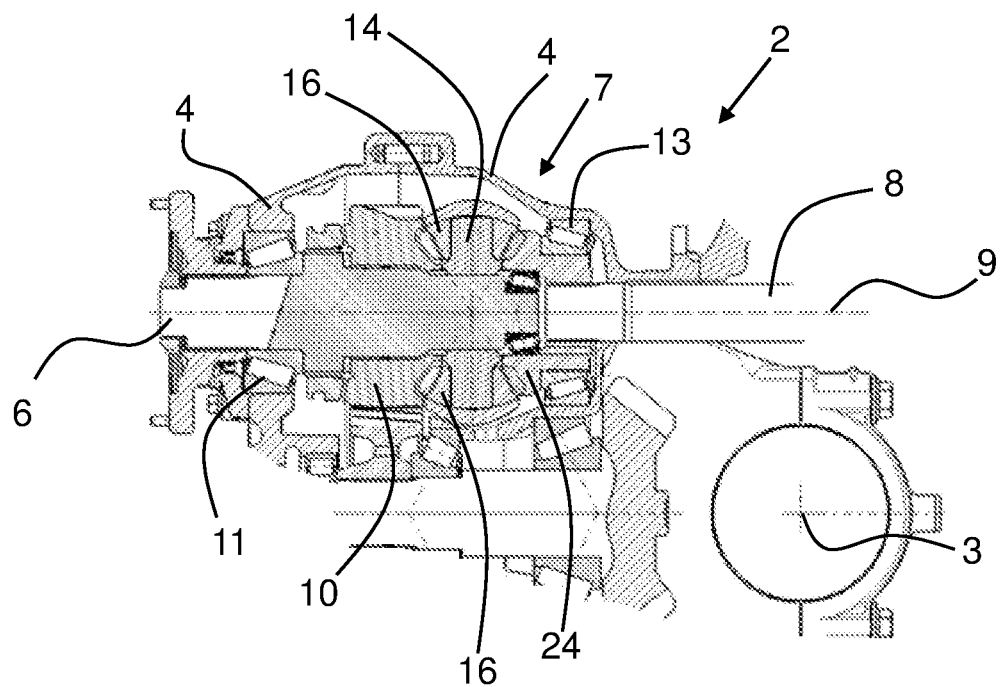
FIGS. 2 and 3 illustrate a cross sections through an axle assembly according to embodiments.

FIG. 2 illustrates a cross section through an axle assembly 2 according to embodiments. The axle assembly 2 comprises a housing 4, and an interaxle differential 7 configured to distribute torque to a first axle 3 and a second axle 5 of a heavy load vehicle, see above. Accordingly, the first axle 3 is a first driven axle 3, and the second axle 5 is a second driven axle 5. The rotational axis of the first axle 3 is indicated in FIG. 2.

The interaxle differential 7 comprises an input shaft 6 and an output shaft 8. The input shaft 6 is journaled in the housing 4 via a first roller bearing 11. The output shaft 8 is journaled in the housing 4 via a second roller bearing 13. The input and output shafts 6, 8 have a common rotational axis 9. Further, the input shaft 6 is journaled in relation to the output shaft 8. Thus, the input shaft 6 is securely journaled in the housing 4. The output shaft 8 may suitably be journaled at its other end, not shown in FIG. 2.

The input shaft 6 is connected to the first axle 3 via a first gear wheel 10. Radially outer cogs of the first gear wheel 10 engage with further gears in a known manner for driving the first axle 3. The output shaft 8 is configured to be connected to the second axle (not shown in FIG. 2). The interaxle differential 7 further comprises a differential spider 14 and at least one pinion gear 16. Mentioned purely as an example, the interaxle differential 7 may comprise four pinion gears 16.

The differential spider 14 is rotationally locked to the input shaft 6. More specifically, a hub of the differential spider 14 is rotationally locked to the input shaft 6. The at least one pinion gear 16 engages with the first gear wheel 10 and the output shaft 8. Cogs arranged on an axial face of the first gear wheel 10 engage with cogs of the at least one pinion gear. The at least one pinion gear 16 engages with the output shaft 8 via a second gear wheel 24, which is rotationally locked to the output shaft 8. The output shaft 8 is journaled in the housing 4 via the second gear wheel 24.

In these embodiments, the first gear wheel 10 and the second gear wheel 24 form differential gears of the interaxle differential 7. The interaxle differential 7 operates in an ordinary manner distributing torque between the first axle 3 and the second axle, permitting rotational speed differences between the first and second axles.

Figure 3:
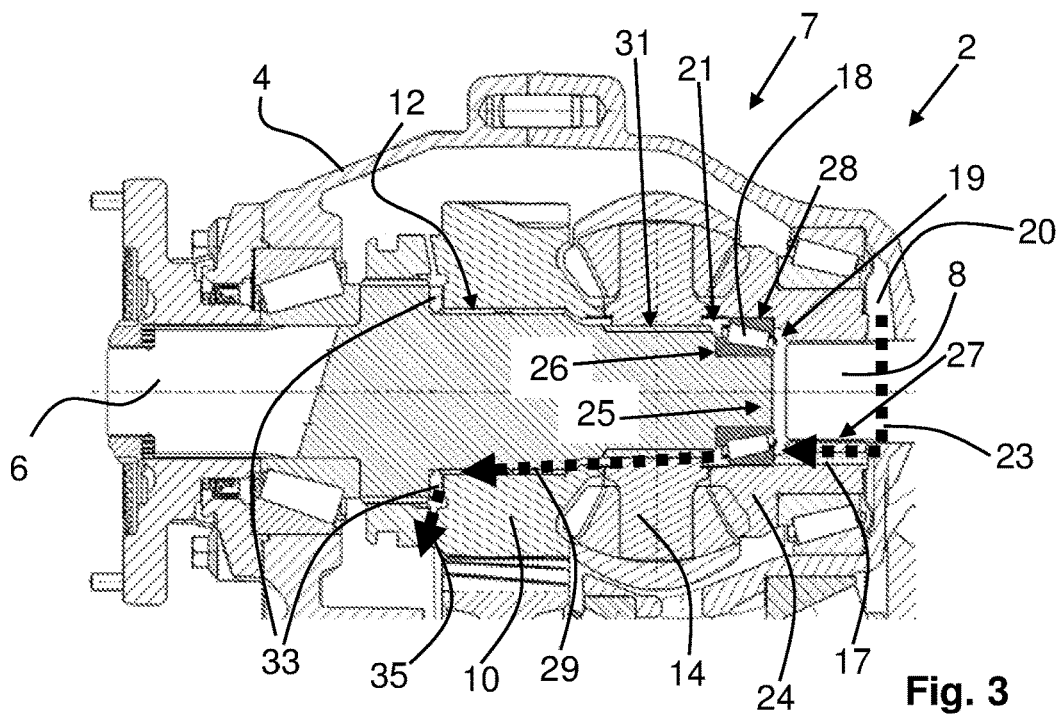

FIG. 3 illustrates a further cross section through the axle assembly 2 of FIG. 2. The input shaft 6 is journaled in relation to the output shaft 8 via a tapered roller bearing 18. The tapered roller bearing 18 has a small end 19 and a large end 21. The small end and large ends 19, 21 are axial ends of the tapered roller bearing 18. At the small end 19, the rollers of the tapered roller bearing 18 have a smaller diameter than at the larger end 21. When there is no rotational speed difference between the input and output shafts 6, 8, the entire tapered roller bearing 18 rotates together with the input and output shafts 6, 8, i.e. there is no rotational speed difference between the inner and outer races of the tapered roller bearing 18.

The first gear wheel 10 is journaled in a first bearing 12 about the input shaft 6. In these embodiments, the first bearing 12 is a plain bearing. According to alternative embodiments, the first bearing 12 may be a roller bearing, such as a needle roller bearing.

A lubricant receiving space 20 is provided in the housing 4. In these embodiments, the lubricant receiving space 20 is arranged between the housing 4 and the second gear wheel 24, extending at least partially about the output shaft 8. The lubricant receiving space 20 may receive lubricant from a lubricant pump (not shown), or from lubricant splashing within the housing 4. The lubricant receiving space 20 is fluidly connected to the small end 19 of the tapered roller bearing 18. The large end 21 of the tapered roller bearing 18 is fluidly connected to the first bearing 12.

When there exists a rotational speed difference between the input and output shafts 6, 8, the tapered roller bearing 18 pumps lubricant from the small end 19 to the large end 21. Accordingly, the tapered roller bearing 18 forms a pump for the lubricant, and is thus, configured to pump lubricant from the lubricant receiving space 20 to the first bearing 12.

The tapered roller bearing 18 is arranged in a first bearing seat 26 provided at an end 25 of the input shaft 6, and a second bearing seat 28 provided in the second gear wheel 24. The end 25 of the input shaft 6 is the end of the input shaft 6 closest to the output shaft 8. In these embodiments, the first bearing seat 26 is provided in the input shaft 6 itself. According to alternative embodiments, the first bearing seat 26 may be provided in a member attached to the end 25 of the input shaft 6.

A first lubricant path 23, indicated with a broken line in FIG. 3, extends through, or along, the second gear wheel 24, from the lubricant receiving space 20 to the small end 19 of the tapered roller bearing 18. Thus, the fluid connection between the lubricant receiving space 20 and the small end 19 of the tapered roller bearing 18 may be provided by the first lubricant path 23. In these embodiments, the first lubricant path 23 extends through the second gear wheel 24. For this purpose, the second gear wheel 24 is provided with one or more axially extending through holes 17. Additionally, or according to alternative embodiments, a splined connection 27 between the second gear wheel 24 and the output shaft 8, may be formed with missing splines and/or enlarged gaps at the top or the bottom of one or more splines.

A second lubricant path 29, indicated with a broken line in FIG. 3, extends through, or along the differential spider 14 from the large end 21 of the tapered roller bearing 18 to the first bearing 12. Thus, the fluid connection between the large end 21 of the tapered roller bearing 18 and the first bearing 12 may be provided by the second lubricant path 29. In these embodiments, the second lubricant path 29 extents along the differential spider 14. For this purpose, a splined connection 31 between the differential spider 14 and the input shaft 6, may be formed with missing splines and/or enlarged gaps at the top or the bottom of one or more splines such that lubricant may flow through the splined connection 31. Additionally, or according to alternative embodiments, the differential spider 14 may be provided with through holes extending in an axial direction in parallel with the input shaft 6, in the same manner as through the second gear wheel 24.

In this manner, the tapered roller bearing 18 pumps lubricant from the lubricant receiving space 20 via the first lubricant path 23 and the second lubricant path 29 to the first bearing 12.

According to some embodiments, the second lubricant path 29 may extend through the first bearing 12, as indicated by the short broken line 35 in FIG. 3. Thus, the tapered roller bearing 18 may pump lubricant to further parts requiring lubrication when there exists a rotational speed difference between the input and output shafts 6, 8. An axial bearing 33 supporting the first gear wheel 10 in an axial direction on the input shaft 6 may form such a further part requiring lubrication when there exists a rotational speed difference between the input shaft 6 and the output shaft 8. The axial bearing 33 may be a plain bearing, a roller bearing or a ball bearing.

In FIG. 3 the first and second lubricant paths 23, 29, 35 are indicated below the input and output shafts 6, 8. However, the first and second lubricant paths 23, 29, 35 may extend along the input and output shafts 6, 8, at various circumferential positions around the input and output shafts 6, 8, in order to permit the tapered roller bearing 21 to pump lubricant unimpededly towards the first bearing 12, and in order to provide lubricant around the circumferentially around the first bearing.

Figure 4A:
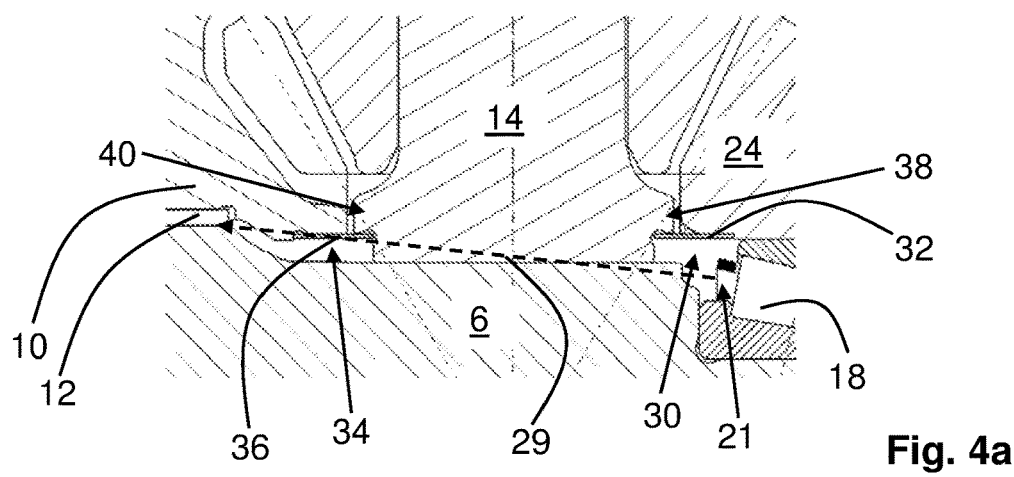
FIGS. 4a and 4b illustrate different embodiments of parts of the axle assembly of FIGS. 2 and 3.
Figure 4B:
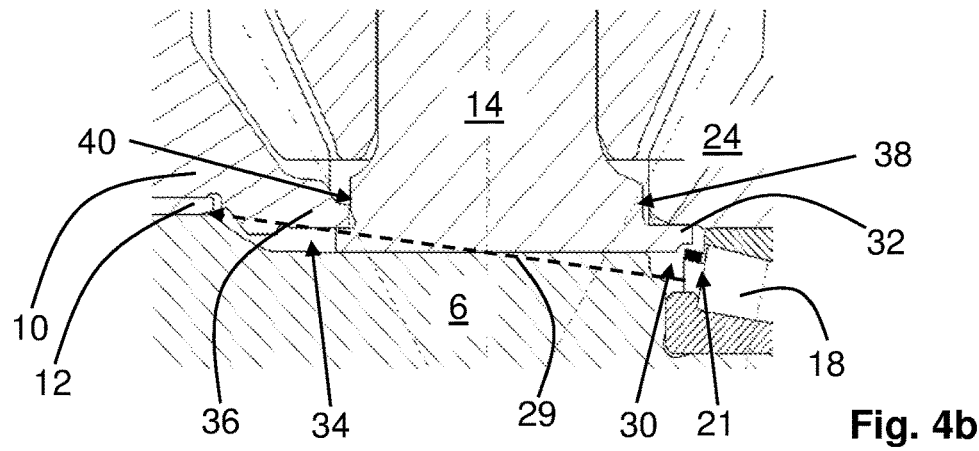

FIGS. 4a and 4b illustrate two different embodiments of parts of the axle assembly 2 of FIGS. 2 and 3. More specifically, different embodiments of the second lubricant path 29, and the components of the axle assembly 2 delimiting the second lubricant path 29 are shown in FIGS. 4a and 4b. In the following, reference is made to both of FIGS. 4a and 4b, unless specific references to one of FIGS. 4a and 4b are made. The second lubricant path 29 is schematically indicated with broken lines in FIGS. 4a and 4b.

The second lubricant path 29 comprises a first annular space 30 formed between the input shaft 6, the large end 21 of the tapered roller bearing 18, and a first axial portion 38 of the differential spider 14. The first axial portion 38 of the differential spider 14 faces in a direction towards the second gear wheel 24 and the large end 21 of the tapered roller bearing 18.

The first annular space 30 is limited in an outer radial direction by a first ring-shaped member 32. In this manner, the first annular space 30 may be mechanically sealed off. Thus, the lubricant pumped from the large end 21 of the tapered roller bearing 18 may be directed along, or through, the differential spider 14. Thus, the lubricant will flow along the second lubricant path 29. The first ring-shaped member 32 may extend in parallel with the input shaft 6. The first ring-shaped member 32 may be formed by a separate member, as shown in FIG. 4a, or alternatively may form part of the differential spider 14, as shown in FIG. 4b, or of the second gear wheel 24.

According to some embodiments, as shown in FIG. 4a, the first ring-shaped member 32 may be connected to the second gear wheel 24 and extend in an axial direction towards the first axial portion 38 of the differential spider 14.

According to some embodiments, as shown in FIG. 4b, the first ring-shaped member 32 may be connected to the differential spider 14 and extend in an axial direction towards the second gear wheel 24.

The second lubricant path 29 further comprises a second annular space 34 formed between the input shaft 6, a second axial portion 40 of the differential spider 14, and the first gear wheel 10. The second axial portion 40 of the differential spider 14 faces in a direction towards the first gear wheel 10.

The second annular space 34 is limited in an outer radial direction by a second ring-shaped member 36. In this manner, the second annular space 34 may be mechanically sealed off. Thus, the lubricant pumped from the tapered roller bearing 18 along or through the differential spider 14, may be directed to the first bearing 12 via the second annular space 34. Thus, the lubricant will flow along the second lubricant path 29. The second ring-shaped member 36 may extend in parallel with the input shaft 6. The second ring-shaped member 36 may be formed by a separate member, as shown in FIG. 4a, or alternatively may form part of the differential spider 14, or of the first gear wheel 10, as shown in FIG. 4b.

According to some embodiments, as shown in FIG. 4b, the second ring-shaped member 36 may be connected to the first gear wheel 10 and extend in an axial direction towards the second axial portion 40 of the differential spider 14.

According to some embodiments, as shown in FIG. 4a, the second ring-shaped member 36 may be connected to the differential spider 14 and extend in an axial direction towards the first gear wheel 10.

In the embodiments shown in FIG. 4b, an overlap is provided between the first ring-shaped member 32 of the differential spider 14 and the second gear wheel 24 in order to mechanically seal off the first annular space 30 in a radially outwardly direction. Similarly, an overlap is provided between the second ring-shaped member 36 of the first gear wheel 10 and the differential spider 14 in order to mechanically seal off the second annular space 34 in a radially outwardly direction.

It is to be understood that the foregoing is illustrative of various example embodiments and that the invention is defined only by the appended claims. A person skilled in the art will realize that the example embodiments may be modified, and that different features of the example embodiments may be combined to create embodiments other than those described herein, without departing from the scope of the invention, as defined by the appended claims.

The invention claimed is:

1. An axle assembly for a heavy load vehicle comprising:
   a housing; and
   an interaxle differential configured to distribute torque to a first axle and a second axle,
   wherein the interaxle differential comprises an input shaft and an output shaft each journaled in the housing and having a common rotational axis, the input shaft being journaled in relation to the output shaft, wherein the input shaft is connected to the first axle via a first gear wheel journaled in a first bearing about the input shaft, and the output shaft is configured to be connected to the second axle, wherein the interaxle differential further comprises a differential spider and at least one pinion gear, the differential spider being rotationally locked to the input shaft, and the at least one pinion gear engaging with the first gear wheel and the output shaft, and a second gear wheel rotationally locked to the output shaft, wherein the input shaft is journaled in relation to the output shaft via a tapered roller bearing having a small end and a large end, wherein a lubricant receiving space is provided in the housing, wherein the lubricant receiving space is fluidly connected to the small end of the tapered roller bearing, wherein the large end of tapered roller bearing is fluidly connected to the first bearing, and wherein a first lubricant path extends through and/or along the differential spider from the large end of the tapered roller bearing to the first bearing, wherein the first lubricant path comprises a first annular space formed between the input shaft, the large end of the tapered roller bearing, and a first axial portion of the differential spider, wherein the first annular space is limited in an outer radial direction by a first ring-shaped member, and wherein the first ring-shaped member is connected to the differential spider and extends in an axial direction towards the second gear wheel.

2. The axle assembly according to claim 1, wherein the second gear wheel is configured to engage with the at least one pinion gear.

3. The axle assembly according to claim 1, wherein the tapered roller bearing is arranged in a first bearing seat provided at an end of the input shaft, and a second bearing seat provided in the second gear wheel.

4. The axle assembly according to claim 1, further comprising a second lubricant path extending through and/or along the second gear wheel from the lubricant receiving space to the small end of the tapered roller bearing.

5. The axle assembly according to claim 1, wherein the first lubricant path extends through the first bearing.

6. The axle assembly according to claim 1, wherein the first lubricant path comprises a second annular space formed between the input shaft, a second axial portion of the differential spider, and the first gear wheel.

7. The axle assembly according to claim 6, wherein the second annular space of the first lubricant path is limited in an outer radial direction by a second ring-shaped member.

8. The axle assembly according to claim 7, wherein the second ring-shaped member is connected to the first gear wheel and extends in an axial direction towards the second axial portion of the differential spider.

9. The axle assembly according to claim 7, wherein the second ring-shaped member is connected to the differential spider and extends in an axial direction towards the first gear wheel.

10. The axle assembly according to claim 1, wherein the output shaft is journaled in the housing via the second gear wheel.

11. The axle assembly according to claim 1, wherein the first lubricant path is in fluid communication with the lubricant receiving space.

12. A heavy load vehicle comprising:
a first driven axle;
a second driven axle; and
an axle assembly arranged between the first driven axle and the second driven axle, wherein the axle assembly comprises:
a housing; and
an interaxle differential configured to distribute torque to a first axle and a second axle, wherein the interaxle differential comprises an input shaft and an output shaft each journaled in the housing and having a common rotational axis, the input shaft being journaled in relation to the output shaft, wherein the input shaft is connected to the first axle via a first gear wheel journaled in a first bearing about the input shaft, and the output shaft is configured to be connected to the second axle, wherein the interaxle differential further comprises a differential spider and at least one pinion gear, the differential spider being rotationally locked to the input shaft, and the at least one pinion gear engaging with the first gear wheel and the output shaft, and wherein a second gear wheel is rotationally locked to the output shaft, wherein the input shaft is journaled in relation to the output shaft via a tapered roller bearing having a small end and a large end, wherein a lubricant receiving space is provided in the housing, wherein the lubricant receiving space is fluidly connected to the small end of the tapered roller bearing, wherein the large end of tapered roller bearing is fluidly connected to the first bearing, and wherein a first lubricant path extends through and/or along the differential spider from the large end of the tapered roller bearing to the first bearing, wherein the first lubricant path comprises a first annular space formed between the input shaft, the large end of the tapered roller bearing, and a first axial portion of the differential spider, wherein the first annular space is limited in an outer radial direction by a first ring-shaped member wherein the first ring-shaped member is connected to the differential spider and extends in an axial direction towards the second gear wheel.

13. An axle assembly for a heavy load vehicle comprising:
a housing; and
an interaxle differential configured to distribute torque to a first axle and a second axle, wherein the interaxle differential comprises an input shaft and an output shaft each journaled in the housing and having a common rotational axis, the input shaft being journaled in relation to the output shaft, wherein the input shaft is connected to the first axle via a first gear wheel journaled in a first bearing about the input shaft, and the output shaft is configured to be connected to the second axle, wherein the interaxle differential further comprises a differential spider and at least one pinion gear, the differential spider being rotationally locked to the input shaft, and the at least one pinion gear engaging with the first gear wheel and the output shaft, wherein the input shaft is journaled in relation to the output shaft via a tapered roller bearing having a small end and a large end, wherein a lubricant receiving space is provided in the housing, wherein the lubricant receiving space is fluidly connected to the small end of the tapered roller bearing, wherein the large end of tapered roller bearing is fluidly connected to the first bearing, and wherein a first lubricant path extends through and/or along the differential spider from the large end of the tapered roller bearing to the first bearing, wherein the first lubricant path comprises a first annular space formed between the input shaft, a first axial portion of the differential spider, and the first gear wheel, and wherein the first annular space is limited in an outer radial direction by a first ring-shaped member.

14. The axle assembly according to claim 13, wherein the first ring-shaped member is connected to the first gear wheel and extends in an axial direction towards the first axial portion of the differential spider.

15. The axle assembly according to claim 13, wherein the first ring-shaped member is connected to the differential spider and extends in an axial direction towards the first gear wheel.

16. The axel assembly according to claim 13, wherein the first lubricant path is in fluid communication with the lubricant receiving space.

17. The axel assembly according to claim 13, wherein a second gear wheel is rotationally locked to the output shaft, and wherein a second lubricant path extends through and/or along the differential spider from the large end of the tapered roller bearing to the first bearing, wherein the second lubricant path comprises a second annular space formed between the input shaft, the large end of the tapered roller bearing, and a first axial portion of the differential spider, wherein the second annular space is limited in an outer radial direction by a second ring-shaped member.

18. A heavy load vehicle comprising:
a first driven axle;
a second driven axle; and
an axle assembly arranged between the first driven axle and the second driven axle, wherein the axle assembly comprises:

a housing; and
an interaxle differential configured to distribute torque to a first axle and a second axle,
wherein the interaxle differential comprises an input shaft and an output shaft each journaled in the housing and having a common rotational axis, the input shaft being journaled in relation to the output shaft,
wherein the input shaft is connected to the first axle via a first gear wheel journaled in a first bearing about the input shaft, and the output shaft is configured to be connected to the second axle,
wherein the interaxle differential further comprises a differential spider and at least one pinion gear, the differential spider being rotationally locked to the input shaft, and the at least one pinion gear engaging with the first gear wheel and the output shaft,
wherein the input shaft is journaled in relation to the output shaft via a tapered roller bearing having a small end and a large end,
wherein a lubricant receiving space is provided in the housing,
wherein the lubricant receiving space is fluidly connected to the small end of the tapered roller bearing,
wherein the large end of tapered roller bearing is fluidly connected to the first bearing, and
wherein a first lubricant path extends through and/or along the differential spider from the large end of the tapered roller bearing to the first bearing, wherein the first lubricant path comprises a first annular space formed between the input shaft, a first axial portion of the differential spider, and the first gear wheel, and wherein the first annular space is limited in an outer radial direction by a first ring-shaped member.

* * * * *